US008080093B2

(12) United States Patent
Ito et al.

(10) Patent No.: US 8,080,093 B2
(45) Date of Patent: Dec. 20, 2011

(54) LIQUID SUPPLY APPARATUS AND LIQUID EJECTING APPARATUS

(75) Inventors: Hiroyuki Ito, Matsumoto (JP); Hideya Yokouchi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 409 days.

(21) Appl. No.: 12/331,961

(22) Filed: Dec. 10, 2008

(65) Prior Publication Data

US 2009/0145299 A1 Jun. 11, 2009

(30) Foreign Application Priority Data

Dec. 11, 2007 (JP) ................................ 2007-319818
Sep. 1, 2008 (JP) ................................ 2008-224152
Nov. 28, 2008 (JP) ................................ 2008-305010

(51) Int. Cl.
*B01D 53/22* (2006.01)
*B01D 19/00* (2006.01)
*B41J 2/19* (2006.01)
*B41J 2/175* (2006.01)

(52) U.S. Cl. ............... 96/6; 96/7; 96/11; 95/46; 95/266; 210/640; 55/385.1; 347/86; 347/92; 347/93; 347/100

(58) Field of Classification Search .................... 96/4, 6, 96/7, 8, 10, 11; 95/46, 47, 54, 266; 210/640; 55/385.1; 347/86, 87, 92, 93, 100
See application file for complete search history.

(56) References Cited

U.S. PATENT DOCUMENTS 4,589,000 A * 5/1986 Koto et al. ...................... 347/92
4,961,082 A * 10/1990 Hoisington et al. ............ 347/92
5,701,148 A * 12/1997 Moynihan et al. .............. 347/92
6,723,147 B2 * 4/2004 Mashiko et al. .................... 96/6
6,790,262 B2 * 9/2004 Sengupta et al. ................... 96/6
6,837,921 B2 * 1/2005 Inoue et al. ......................... 96/6
6,860,922 B2 * 3/2005 Watari et al. ........................ 96/6
7,238,224 B2 * 7/2007 Kent ................................ 95/46
7,455,396 B2 * 11/2008 Wakayama ..................... 347/86
7,819,514 B2 * 10/2010 Uezawa .......................... 347/92
2006/0048647 A1 * 3/2006 Iwata .................................. 96/6
2006/0137526 A1 * 6/2006 Ueda .................................. 96/6

FOREIGN PATENT DOCUMENTS

JP 2005-342960 12/2005
JP 2005-342961 12/2005
JP 2006-095878 4/2006
JP 2007-203523 8/2007

* cited by examiner

*Primary Examiner* — Jason M Greene
(74) *Attorney, Agent, or Firm* — Workman Nydegger

(57) ABSTRACT

Provided is a liquid supply apparatus including: a liquid supply path which supplies a liquid from an upstream side, which is a liquid supply source, to a downstream side in which the liquid is consumed; a defoaming chamber which is provided in the liquid supply path and defoams air bubbles included in the liquid; and a depressurization chamber which is provided at a position adjacent to the defoaming chamber with a partition interposed therebetween and is depressurized such that the pressure thereof becomes lower than the pressure of the defoaming chamber, wherein the partition allows permeation of gas by the depressurization of the depressurization chamber and restricts permeation of the liquid, and wherein the partition is configured by a partition wall having rigidity.

9 Claims, 5 Drawing Sheets

LIQUID SUPPLY APPARATUS AND LIQUID EJECTING APPARATUS

The entire disclosure of Japanese Patent Application No. 2007-319818, filed Dec. 11, 2007 and Japanese Patent Application No. 2008-224152, filed Sep. 1, 2008 and Japanese Patent Application No. 2008-305010, filed Nov. 28, 2008 are expressly incorporated herein by reference.

BACKGROUND

1. Technical Field

The present invention relates to a liquid ejecting apparatus such as an ink jet printer and a liquid supply apparatus including the liquid ejecting apparatus.

2. Related Art

Generally, a liquid ejecting apparatus for ejecting an ink (liquid) from nozzles of a recording head (liquid ejecting head) toward a target and, for example, an ink jet printer (hereinafter, referred to as a "printer") is widely used. In such a printer, if air bubbles are generated in the ink ejected from the recording head, a printing failure such as dot missing may be caused. Accordingly, a printer capable of degassing (eliminating) gas dissolved in the ink such that the printing failure can be suppressed is suggested (for example, see JP-A-2006-95878).

In the printer of JP-A-2006-95878, a portion of a sidewall forming a common liquid chamber (defoaming chamber) of a print head (liquid supply apparatus) is formed by a gas permeable film (partition wall), and a chamber (depressurizing chamber) depressurized using a pump is provided to oppose the common liquid chamber with the gas permeable film interposed therebetween. In addition, the inside of the chamber is depressurized by the pump, a pressure difference between the common liquid chamber and the chamber is generated and the gas dissolved in the ink contained in the common liquid chamber is degassed into the chamber via the gas permeable film by the pressure difference.

The defoaming efficiency of the air bubbles generated in the ink contained in the common liquid chamber is increased as the thickness of the gas permeable film is decreased. Accordingly, in the printer of JP-A-2006-95878, since the whole thickness of the gas permeable film is uniformly small, the defoaming efficiency of the gas dissolved in the ink in the common liquid chamber can be improved, but the strength of the gas permeable film cannot be ensured.

SUMMARY

An advantage of some aspects of the invention is that it provides a liquid supply apparatus and a liquid ejecting apparatus capable of efficiently defoaming air bubbles staying in a defoaming chamber to a depressurization chamber while the strength of the partition wall interposed between the defoaming chamber and the depressurization chamber is ensured.

According to an aspect of the invention, there is provided a liquid supply apparatus including: a liquid supply path which supplies a liquid from an upstream side, which is a liquid supply source, to a downstream side in which the liquid is consumed; a defoaming chamber which is provided in the liquid supply path and defoams air bubbles included in the liquid; and a depressurization chamber which is provided at a position adjacent to the defoaming chamber with a partition interposed therebetween and is depressurized such that the pressure thereof becomes lower than the pressure of the defoaming chamber, wherein the partition allows permeation of gas by the depressurization of the depressurization chamber and restricts permeation of the liquid, and wherein the partition is configured by a partition wall having rigidity.

By this configuration, since the partition is configured by the partition wall having rigidity instead of a film without rigidity, it is possible to readily perform an operation for attaching the partition.

In the liquid supply apparatus of the invention, a portion of the partition wall configuring the partition may have a thickness smaller than that of the other portion of the partition wall except the portion configuring the partition.

By this configuration, in the partition wall, the partition has gas permeability higher than that of the other portion except the partition and the other portion except the partition has rigidity higher than that of the partition. Accordingly, the air bubbles staying in the defoaming chamber can be efficiently defoamed from the partition to the depressurization chamber while the strength of the partition wall interposed between the defoaming chamber and the depressurization chamber is ensured in the other portion except the partition.

In the liquid supply apparatus of the invention, the depressurization chamber and the defoaming chamber may be disposed such that, in portions which are adjacent to each other with the partition interposed therebetween, the portion of the depressurization chamber is higher than the portion of the defoaming chamber in a vertical direction.

By this configuration, the air bubbles staying at the upper side of the vertical direction in the defoaming chamber can be efficiently defoamed to the portion of the defoaming chamber located at the upper side of the vertical direction via the partition.

According to another aspect of the invention, there is provided a liquid supply apparatus including: a liquid supply path which supplies a liquid from an upstream side, which is a liquid supply source, to a downstream side in which the liquid is consumed; a defoaming chamber which is provided in the liquid supply path and defoams air bubbles included in the liquid; and a depressurization chamber which is provided at a position adjacent to the defoaming chamber with a partition wall interposed therebetween and is depressurized such that the pressure thereof becomes lower than the pressure of the defoaming chamber, wherein the partition wall allows permeation of gas by the depressurization of the depressurization chamber and restricts permeation of the liquid, wherein the depressurization chamber and the defoaming chamber partially overlap with each other in an upper and lower direction, and wherein the partition interposed between the defoaming chamber and the depressurization chamber has a thickness smaller than that of other portion of the partition wall except the partition.

By this configuration, in the partition wall, the partition has gas permeability higher than that of the other portion except the partition and the other portion except the partition has rigidity higher than that of the partition. Accordingly, the air bubbles staying in the defoaming chamber can be efficiently defoamed from the partition to the depressurization chamber while the strength of the partition wall interposed between the defoaming chamber and the depressurization chamber is ensured in the other portion except the partition.

In the liquid supply apparatus of the invention, the partition may be disposed so as to overlap with the depressurization chamber and an outlet for discharging the liquid from the defoaming chamber to the downstream side in an upper and lower direction.

Since the air bubbles suspended in the liquid contained in the defoaming chamber move by the flow of the liquid, the air bubbles are susceptible to stay in the vicinity of the outlet. By this configuration, since the partition is disposed so as to overlap with the depressurization chamber and the outlet in the upper and lower direction, the air bubbles staying in the defoaming chamber can be efficiently defoamed to the depressurization chamber.

In the liquid supply apparatus of the invention, the area of the partition which is in contact with the defoaming chamber may be larger than the area of the opening of the outlet formed in the defoaming chamber.

The flow rate of the inks passing through the defoaming chamber is decreased as the size of the opening of the outlet is decreased, that is, is proportional to the size of the opening of the outlet. In contrast, the amount of gas defoamed from the defoaming chamber is increased as the area of the partition is increased, that is, is proportional to the area of the partition. By this configuration, the area of the partition is larger than that of the opening of the outlet and thus the air bubbles can be efficiently defoamed from the liquid passing through the defoaming chamber.

In the liquid supply apparatus of the invention, the partition wall may be configured by a plate material having rigidity.

By this configuration, the strength of the partition wall can be ensured with certainty.

In the liquid supply apparatus of the invention, the defoaming chamber may be arranged in plurality and at least a portion of sectioning walls for sectioning the defoaming chambers may be configured so as to allow the permeation of the gas by the depressurization of the depressurization chamber.

By this configuration, since the air bubbles staying in the defoaming chambers can freely move between the defoaming chambers via the sectioning walls due to the pressure difference between the defoaming chambers and the depressurization chamber, the air bubbles of the defoaming chambers, in which the defoaming is not completed, move to a defoaming chamber, in which the defoaming is first completed, permeate the sectioning walls of the defoaming chamber, in which the defoaming is first completed, and are defoamed to the depressurization chamber. Accordingly, the defoaming of the air bubbles is compensated for by the defoaming chambers, and thus the air bubbles staying in the defoaming chambers are efficiently defoamed to the depressurization chamber.

A liquid ejecting apparatus of the invention includes a liquid ejecting head which ejects a liquid, and the liquid supply apparatus for supplying the liquid. By this configuration, the above-described effects can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, as a liquid ejecting apparatus of the invention, an ink jet printer will be described with reference to the accompanying drawings. In the following description, "front and back direction", "left and right direction" and "upper and lower direction" respectively correspond to front and back direction, left and right direction and upper and lower direction shown in arrows of FIG. 1.

Figure 1:
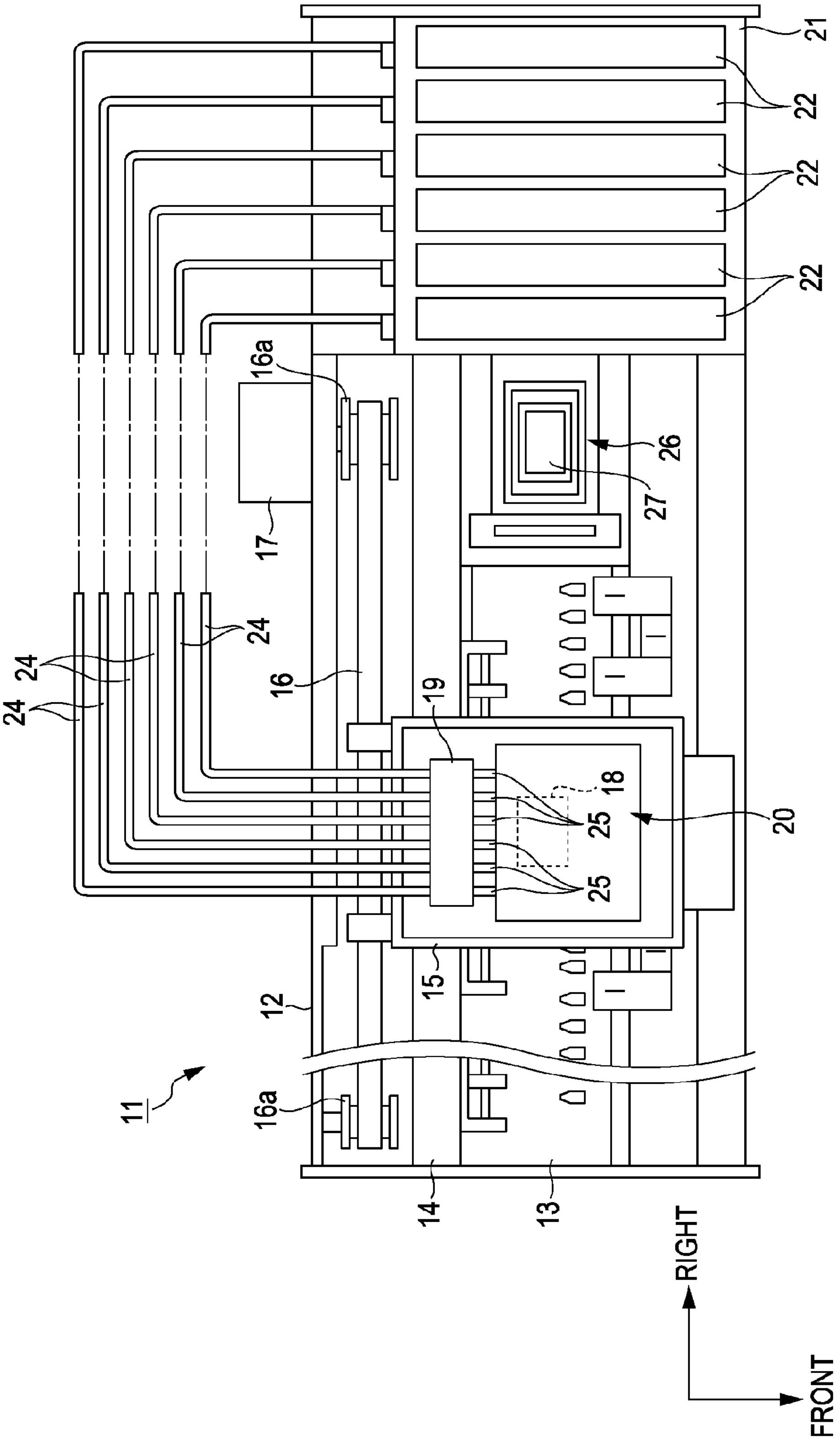
FIG. 1 is a schematic plan view of a printer of an embodiment of the invention.

As shown in FIG. 1, the ink jet printer 11 as the liquid ejecting apparatus includes a main body frame 12 having a rectangular shape in plan view. In the main body frame 12, a platen 13 extends along the left and right direction which is a main scan direction. On the platen 13, a recording sheet (not shown) is fed by a sheet feed mechanism (not shown) along the front and back direction which is a sub scan direction. In the main body frame 12, a rod-shaped guide shaft 14 extends above the platen 13 in parallel to the longitudinal direction (left and right direction) of the platen 13.

A carriage 15 is supported on the guide shaft 14 so as to be reciprocally moved along the guide shaft 14. The carriage 15 is connected to a carriage motor 17 provided on a back surface of the main body frame 12 via an endless timing belt 16 stretched over a pair of pulleys 16*a* provided on the rear wall inner surfaces of the main body frame 12. Accordingly, the carriage 15 is reciprocally moved along the guide shaft 14 by the driving of the carriage motor 17.

As shown in FIG. 1, a recording head 18 as a liquid ejecting head is supported on a lower end of the carriage 15 which opposes the platen 13. In the carriage 15, a valve unit 19 for supplying inks as a liquid temporarily stored to a downstream side (the side of the recording head 18) and a defoaming unit 20 which deforms air bubbles included in the ink supplied from the valve unit 19, supplies the defoamed ink to the recording head 18, and has a rectangular shape in plan view are mounted.

In a lower surface of the recording head 18, a plurality of nozzles (not shown) is formed. By driving a piezoelectric element (not shown) provided in the recording head 18, ink droplets are ejected from the openings of the nozzles onto a recording sheet (not shown) fed on the platen 13, thereby performing printing.

A cartridge holder 21 is provided on a right end of the inside of the main body frame 12, and a plurality (six in the present embodiment) of ink cartridges 22 for receiving inks having different types (colors) is detachably mounted in the cartridge holder 21. The ink cartridge 22 is positioned at an upstream side as a liquid supply source. The cartridge holder 21 is connected to the valve unit 19 mounted in the carriage 15 via a plurality (six in the present embodiment) of ink supply tubes 24.

In addition, in a state in which the ink cartridges 22 are mounted in the cartridge holder 21, the ink cartridges 22 communicate with the valve unit 19 via the ink supply tubes 24. In addition, the valve unit 19 temporarily and separately stores the inks supplied from the ink cartridges 22 via the ink supply tubes 24, and the inks which are separately and temporarily stored are supplied to the defoaming unit 20 via channels 25.

As shown in FIG. 1, in a home position region of the carriage 15 which the right end of the inside of the main body frame 12, a maintenance unit 26 for performing maintenance such as cleaning of the recording head 18 is provided. This maintenance unit 26 includes a cap 27 which is in contact with the recording head 18 so as to surround the openings of the nozzles (not shown) of the recording head 18 or receives the inks discharged from the openings of the nozzles by flashing and a suction pump (not shown) for sucking the inside of the cap 27.

By sucking the inside of the cap 27 by the suction pump (not shown) in a state in which the cap 27 is in contact with the recording head 18 so as to surround the openings of the nozzles (not shown) of the recording head 18, a cleaning process of forcedly discharging the thickened inks or air bubbles from the openings of the nozzles (not shown) into the cap 27 is performed.

Next, the configuration of the defoaming unit 20 will be described in detail.

Figure 2:
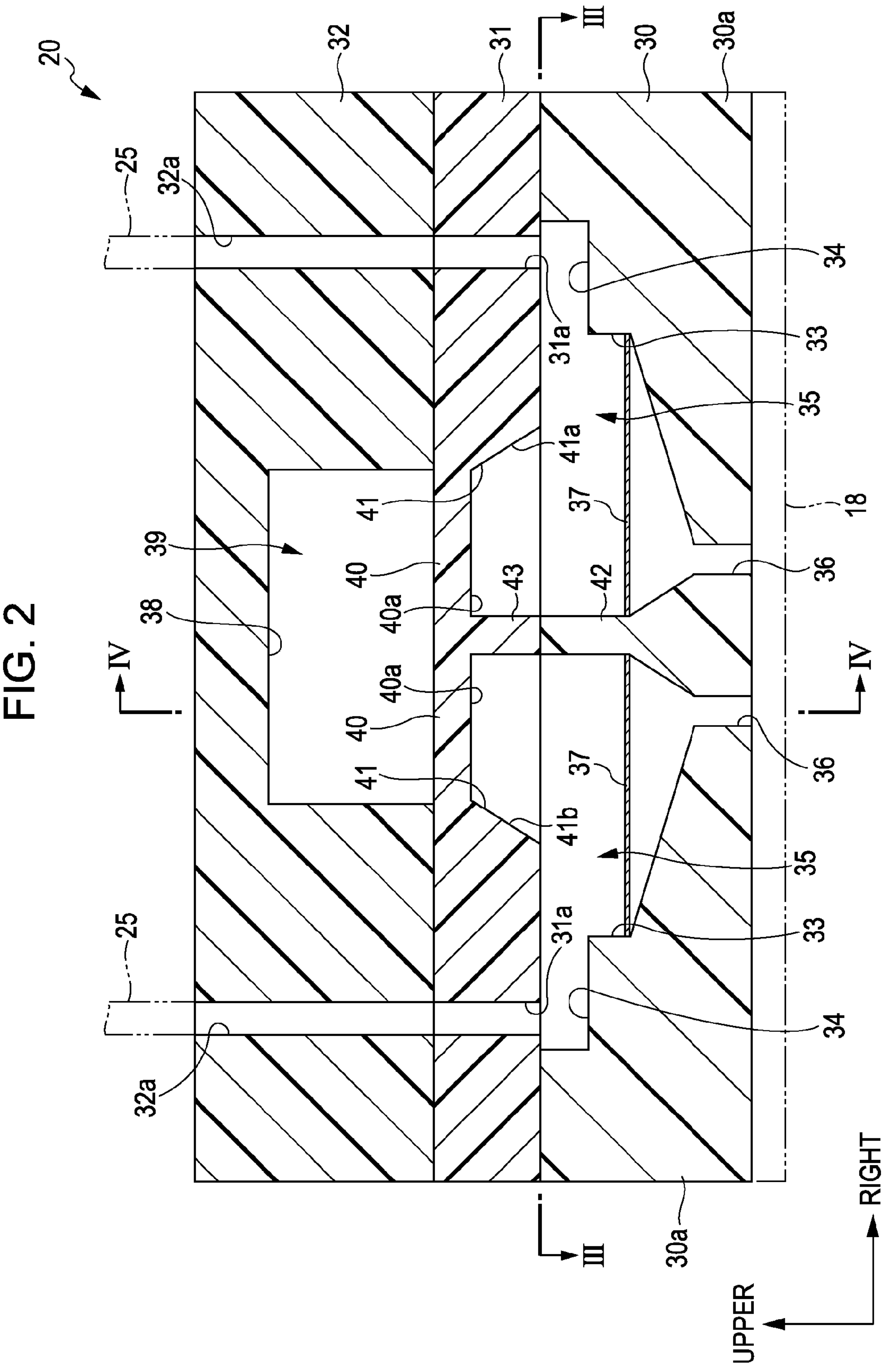
FIG. 2 is a cross-sectional view of a defoaming unit of the printer.

As shown in FIG. 2, the defoaming unit 20 includes a defoaming chamber forming member 30 having a flat plate shape, a partition wall 31 having a flat plate shape and laminated on the upper surface of the defoaming chamber forming member 30, and a depressurization chamber forming member 32 having a flat plate shape and laminated on the upper surface of the partition wall 31. The defoaming chamber forming member 30, the partition wall 31 and the depressurization chamber forming member 32 are formed of a plate material of rigid synthetic resin. The material of the partition wall 31 is different from that of the defoaming chamber forming member 30 or the depressurization chamber forming member 32. The gas permeability of the synthetic resin configuring the defoaming chamber forming member 30 and the depressurization chamber forming member 32 is lower than that of the synthetic resin configuring the partition wall 31.

Figure 3:
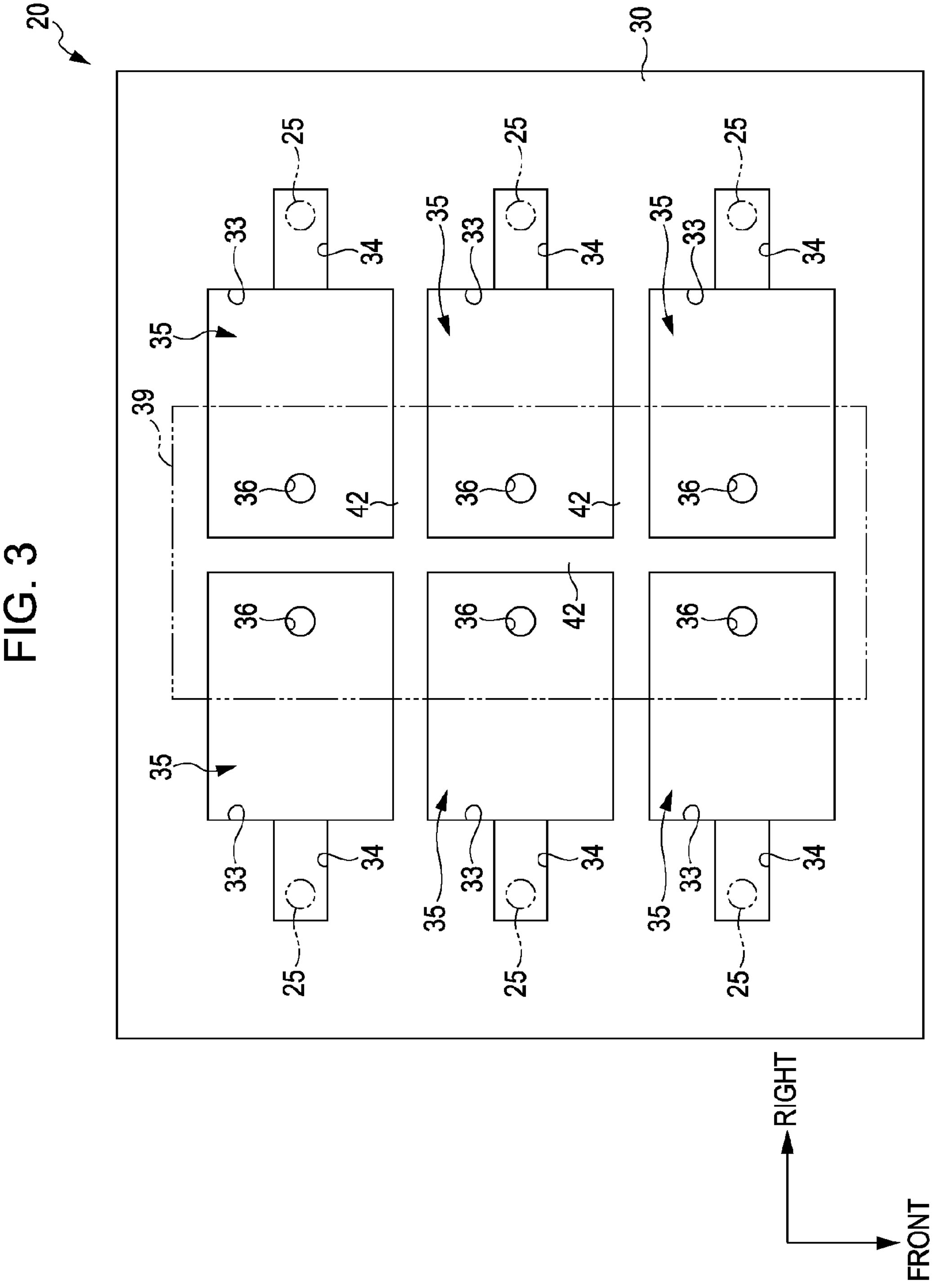
FIG. 3 is a cross-sectional view taken along line III-III of FIG. 2.

As shown in FIG. 3, a plurality (six in the present embodiment) of defoaming concave portions 33 having a laterally long rectangular shape in plan view is formed in the upper surface of the defoaming chamber forming member 30. The defoaming concave portions 33 are arranged at the same interval in the front and back direction and the left and right direction so as to be arranged in three rows in the front and back direction and in two rows in the left and right direction. That is, the six defoaming concave portions 33 are symmetrically arranged at the left and right side three by three with respect to the central portion of the defoaming chamber forming member 30 in the left and right direction.

In the upper surface of the defoaming chamber forming member 30, at the right side of the three defoaming concave portion 33 arranged at the right side of the central portion of the left and right direction of the defoaming chamber forming member 30 and the left side of the three defoaming concave portions 33 arranged at the left side of the central portion of the left and right direction of the defoaming chamber forming member 30, connecting concave portions 34 having a laterally long rectangular shape in plan view are provided so as to correspond to the defoaming concave portions 33.

The width of the connecting concave portions 34 in the front and back direction is ⅓ of that of the defoaming concave portions 33 in the front and back direction and the depth thereof is smaller than that of the defoaming concave portions 33. The six connecting concave portions 34 communicate with the six defoaming concave portions 33. Six spaces surrounded by the defoaming concave portions 33 and the partition wall 31 become defoaming chambers 35 for holding air bubbles included in the inks so as to defoam the air bubbles.

Figure 4:
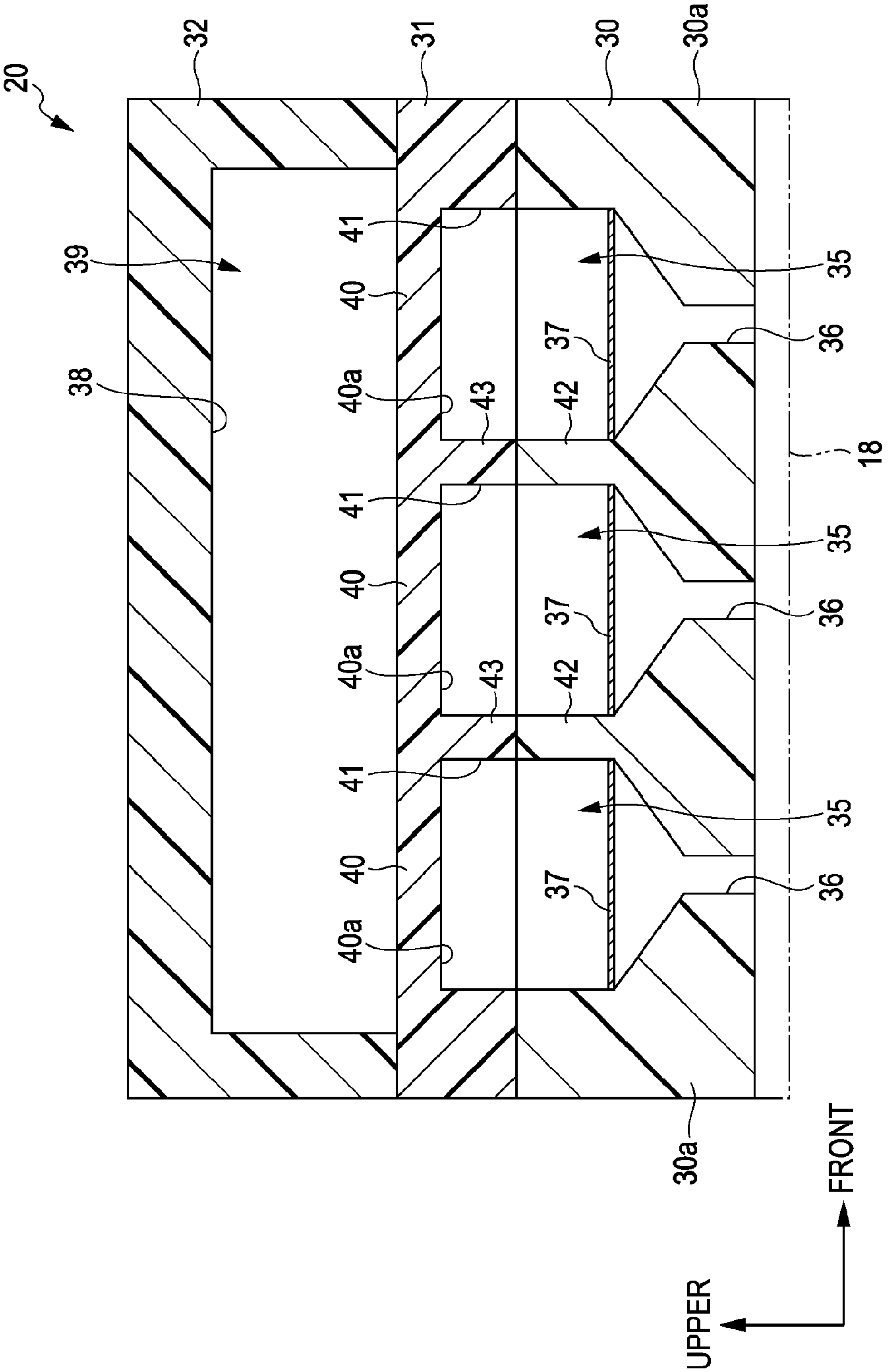
FIG. 4 is a cross-sectional view taken along line IV-IV of FIG. 2.

As shown in FIGS. 2 to 4, in the bottom surfaces of the defoaming concave portions 33, outlets 36 for discharging the inks in the defoaming chambers 35 to the recording head 18 positioned at the downstream side for consuming the inks are formed in the central portion of the front and back direction and the end of the central portion of the left and right direction of the defoaming chamber forming member 30. The bottom surfaces of the defoaming concave portions 33 are inclined as descending toward the outlets 36. The bottom surfaces of the defoaming concave portions 33 are covered by a filter 37 having a horizontal plate shape from the upper side.

In the central portion of the lower surface of the depressurization chamber forming member 32, a depressurization concave portion 38 which is long in the front and back direction and has a rectangular shape in plan view is formed, and a space surrounded by the depressurization concave portion 38 and the partition wall 31 becomes a depressurization chamber 39. The internal pressure of the depressurization chamber 39 is reduced to be lower than that of the pressure of the defoaming chambers 35 by a depressurization pump (not shown). The depressurization chamber 39 partially overlaps with a substantially half of the outputs 36 of the defoaming chambers 35 in plan view, as shown in FIG. 3. That is, the depressurization chamber 39 overlaps with the outlets 36 of the defoaming chambers 35 in plan view (upper and lower direction). In this case, the defoaming chambers 35 are positioned above the outlets 36 and the depressurization chamber 39 is positioned above the defoaming chambers 35.

The partition wall 31 is made of a material, to which gas is permeable when the depressurization chamber 39 is depressurized, such as polyacetal (POM), polypropylene (PP), or polyphenylene ether (PPE).

A portion of the partition wall 31 sandwiched between the depressurization chamber 39 and the defoaming chambers 35 is partitioned by a partition 40, and the depressurization chamber 39 is disposed vertically adjacent to the defoaming chambers 35 with the partition 40 interposed therebetween. That is, since partition wall concave portions 41 as an air bubble integrating portion and a concave portion are formed in the lower surface of the portion of the partition wall 31 sandwiched between the depressurization chamber 39 and the defoaming chambers 35, the thickness of the upper and lower direction (vertical direction) of the partition 40 of the partition wall 31 is smaller than that of the other portion except the partition. Accordingly, the partition 40 has gas permeability higher than that of the portion having the thickness of the other portion except the partition 40.

The thickness of the partition 40 is set to a thickness for allowing the air bubbles included in the defoaming chambers 35 to permeate by the depressurization, and the thickness of the other portion of the partition wall 31 except the partition 40 is set to a thickness for disallowing air to permeate from the outside of the defoaming chambers 35 to the inside of the defoaming chambers 35 by the depressurization. The partition wall concave portions 41 overlap with the depressurization chamber 39 and the outlets 36 in the upper and lower direction (vertical direction).

In the present embodiment, by the result of the experiment, if the area of the partition 40 is about 1 $cm^2$ and the thickness thereof is about 1 mm, it can be seen that permeability is suitable. In addition, if the material of the partition has an air permeability coefficient of 5 $cc \cdot mm/m^2 \cdot day \cdot atm$ or more and a moisture permeability coefficient of 30 $g \cdot mm/m^2 \cdot day \cdot atm$ or less, permeability is suitable. If these conditions are satisfied, the partition wall 31 can be configured by other materials.

The right side surface 41_a_ of the partition wall concave portion 41 corresponding to the three defoaming concave portions 33 disposed at the right side of the central portion of the left and right direction of the defoaming chamber forming member 30 is a slope surface extending toward the left upper side. The left side surface 41_b_ of the partition wall concave portion 41 corresponding to the three defoaming concave portions 33 disposed at the left side of the central portion of the left and right direction of the defoaming chamber forming member 30 is a slope surface extending toward the right upper side. Accordingly, the air bubbles included in the defoaming chambers 35 can be moved toward the partition 40 along the right side surface 41_a_ and the left side surface 41_b_ of the partition wall concave portions 41.

The partition 40 has a thickness smaller than that of a wall 30*a* for isolating the defoaming chambers 35 of the defoaming chamber forming member 30 and atmosphere, and a sectioning wall 42 of the defoaming chamber forming member 30 for sectioning the defoaming chambers 35 and a sectioning wall 43 of the partition wall 31, both of which are located above the filter 37, have the same thickness as the partition 40. In this case, the both sectional walls 42 and 43 are fitted with each other in the upper and lower direction and the thicknesses of the both sectioning walls 42 and 43 are set such that the air bubbles included in the defoaming chambers 35 permeate and move between the defoaming chambers 35 by the depressurization. The bottom surfaces of the partition wall concave portions 41, that is, the wall surfaces 40*a* of the partition 40 at the side of the defoaming chambers 35, are coated with a liquid repelling agent having ink repellency. That is, the wall surface 40*a* has liquid repellency. The area of each of the wall surfaces 40*a* is larger than the opening area of each of the outlets 36 formed in the defoaming chambers 35.

As shown in FIG. 2, first through-passages 31*a* passing through the partition wall 31 are formed in the partition wall 31 at positions corresponding to the connecting concave portions 34 of the defoaming chamber forming member 30, and second through-passages 32*a* passing through the depressurization chamber forming member 32 are formed in the depressurization chamber forming member 32 at positions corresponding to the first through-passages 31*a*. The lower ends of the channels 25 extending from the valve unit 19 (see FIG. 1) are connected to the upper ends of the second through-passages 32*a*.

The lower ends of the second through-passages 32*a* are connected to the upper ends of the first through-passages 31*a* and the lower ends of the first through-passages 31*a* are connected to the connecting concave portions 34. The channels 25 communicate with the connecting concave portions 34 via the second through-passages 32*a* and the first through-passages 31*a*.

In the present embodiment, a liquid supply path is configured by the ink supply tubes 24, the valve unit 19, the channels 25, the second through-passages 32*a*, the first through-passages 31*a*, the connecting concave portions 34, the defoaming chambers 35 and the outlets 36, and a liquid supply device is configured by the ink supply tubes 24, the valve unit 19, the channels 25 and the defoaming unit 20.

Next, the operation of the defoaming unit 20 will be described.

When the inks are supplied from the channels 25 to the defoaming unit 20, the inks are respectively supplied to the defoaming chambers 35 via the second through-passages 32*a*, the first through-passages 31*a* and the connecting concave portions 34. The inks supplied to the defoaming chambers 35 are supplied from the outlets 36 to the recording head 18 in a state in which impurities thereof are eliminated by the filter 37.

At this time, air bubbles may be included in the inks supplied to the defoaming chambers 35. Since the wall surface 40*a* of the partition 40 at the side of the defoaming chambers 35 has liquid repellency for repelling the ink, the air bubbles are susceptible to be collected in the vicinity of the wall surface 40*a*. In the defoaming chambers 35, since the inks flow toward the outlets 36 located on the opposite side of the connecting concave portions 34 in the horizontal direction, the air bubbles suspended in the inks are susceptible to stay at the sides of the outlets 36. In addition, in the partition wall 31, the partition 40 has a thickness smaller than the other portion except the partition in the upper and lower direction, and the right side surface 41*a* or the left side surface 41*b* having the slope surface shape toward the upper side (the side of the partition 40) is formed on the upper surfaces of the defoaming chambers 35. Accordingly, when the inks flow from the connecting concave portions 34 to the outlets 36, the air bubbles suspended in the inks move to the upper side (the side of the partition 40) along the right side surface 41*a* or the left side surface 41*b* and thus the air bubbles are collected in the vicinity of the wall surface 40*a*.

The air bubbles suspended in the inks included in the defoaming chambers 35 are integrated in the partition wall concave portions 41. Since the depressurization chamber 39 is disposed above the partition wall concave portions 41, if the pressure of the depressurization chamber 39 is reduced by the depressurization pump (not shown) so as to be lower than that of the defoaming chambers 35 (the pressure of the depressurization chamber 39 is reduced to about −30 kPa in the present embodiment), the air bubbles integrated in the partition wall concave portions 41 are efficiently defoamed to the depressurization chamber 39 via the partition 40 by the pressure difference between the depressurization chamber 39 and the defoaming chambers 35. In this case, the depressurization chamber 39 may not be depressurized after the air bubbles are integrated in the partition wall concave portions 41. For example, the air bubbles may be integrated in the partition wall concave portions 41 after the depressurization chamber 39 is depressurized.

The air bubbles are generated when the gas dissolved in the ink is grown from the ink cartridge 22 to the defoaming chambers 35 due to the invasion of atmosphere at the time of the exchange of the ink cartridge 22 or a variation in temperature when the ink jet printer 11 is not used. Since the frequency of the generation of the air bubbles cannot be estimated, the depressurization chamber 39 may be always in the depressurization state when the ink jet printer 11 is used and the generated air bubbles may be integrated in the defoaming chambers 35 so as to be defoamed to the depressurization chamber 39.

The depressurization pump (not shown) for depressurizing the depressurization chamber 39 may not be always driven and a valve (not shown) may be disposed between the depressurization chamber 39 and the depressurization pump such that the valve is closed after the depressurization chamber 39 is depressurized and the driving of the depressurization pump is then stopped. Although the depressurization pump is not always driven, the depressurization chamber 39 may be maintained in the depressurization state for a long period of time.

Since the both sectioning walls 42 and 43 for sectioning the defoaming chambers 35 allow the permeation of the gas by the depressurization of the depressurization chamber 39, the air bubbles staying in the defoaming chambers 35 can permeate the sectioning walls 42 and 43 and freely move between the defoaming chambers 35. Accordingly, the air bubbles of the defoaming chambers 35 in which the defoaming is not completed permeate the both sectioning walls 42 and 43 and move to a defoaming chamber 35, in which the defoaming is first completed, of the defoaming chambers 35. That is, the air bubbles of the defoaming chambers 35 are subjected to the depressurization of the depressurization chamber 39 via the partition 40 and are indirectly subjected to the depressurization of the depressurization chamber 39 via the sectioning chambers 42 and 43. As a result, the defoaming of the air bubbles is compensated for by the defoaming chambers 35, and thus the air bubbles staying in the defoaming chambers 35 are efficiently defoamed to the depressurization chamber 39.

For example, if the partition 40 is formed of a thin gas permeable film, the strength of the gas permeable film or the strength of the other channel is insufficient and the pressure difference between the depressurization chamber 39 and thus the defoaming chambers 35 may not be maintained. In particular, if the degassing process of eliminating the air bubbles dissolved in the inks contained in the defoaming chambers 35 is performed, the pressure of the depressurization chamber 39 is reduced from −80 kPa to about vacuum. Thus, the gas permeable film may be broken or the channel may be damaged due to the pressure difference of the depressurization chamber 39 and the defoaming chambers 35. If the defoaming chamber forming member 30 forming the defoaming chambers 35 is formed of a gas permeable material, air (atmosphere) is introduced from the outside of the defoaming chambers 35 by the depressurization of the depressurization chamber 39. Thus, the defoaming may not be efficiently performed with certainty.

In addition, since the gas permeable film is bent toward the depressurization chamber 39 if the depressurization chamber 39 is depressurized and is restored if the depressurization state of the depressurization chamber 39 is eliminated, the inks may be unnecessarily discharged from the nozzles of the recording head 18 by the displacement operation of the gas permeable film. Since the gas permeable film may absorb the ejection of the inks from the nozzles of the recording head 18 due to the driving of the piezoelectric element at the time of the printing of the ink jet printer 11, it is difficult to control the ejection of the inks. In addition, if the partition 40 is formed of the gas permeable film, it is difficult to attach the gas permeable film to the partition wall 31.

Since the partition 40 (partition wall 31) has rigidity in the present embodiment, the strength of the partition 40 is sufficiently ensured and thus the pressure difference between the depressurization chamber 39 and the defoaming chambers 35 can be maintained with certainty. Since the partition 40 has rigidity, the pressure difference between the depressurization chamber 39 and the defoaming chambers 35 can be sufficiently maintained even when the degassing of the inks contained in the defoaming chambers 35 is performed.

Since the partition 40 has rigidity in the present embodiment, the partition is not displaced due to the variation in pressure of the depressurization chamber 39 or the partition may not absorb the ejection of the inks from the nozzles of the recording head 18 due to the driving of the piezoelectric element at the time of the printing of the ink jet printer 11. Accordingly, the inks are not unnecessarily discharged from the nozzles of the recording head 18 or the ejection of the inks can be readily controlled. In addition, since the partition 40 of the present embodiment configures a portion of the partition wall 31 formed of synthetic resin having rigidity, the partition can be readily formed integrally with the partition wall 31. Accordingly, the operation for attaching the partition 40 to the partition wall 31 is unnecessary.

According to the above-described embodiment, the following effects can be obtained.

(1) Since the wall surfaces 40*a* of the partition 40 located at the side of the defoaming chambers 35 are coated with the liquid repelling agent having ink repellency, if the air bubbles are suspended in the inks contained in the defoaming chambers 35, the air bubbles are susceptible to be collected at the side of the partition 40 (the depressurization chamber 39). Accordingly, since the air bubbles staying in the defoaming chambers 35 are susceptible to be deformed to the depressurization chamber 39 via the partition 40 by the pressure difference between the defoaming chambers 35 and the depressurization chamber 39, the air bubbles staying in the defoaming chambers 35 can be efficiently deformed to the depressurization chamber 39. Although, in the present embodiment, the positional relationship among the right side surface 41*a* and the left side surface 41*b* (slope surface) or the outlets 36 and the depressurization chamber 39 is adjusted, the effect can be obtained by the coating of the liquid repelling agent. By coating a portion of a horizontal surface with the liquid repelling agent instead of the slope surface, the air bubbles are susceptible to be collected in the coated portion.

(2) Generally, since the air bubbles suspended in the inks contained in the defoaming chambers 35 flow from the connecting concave portions 34 to the outlets 36 by the flow of the inks, the air bubbles are susceptible to stay in the vicinity of the outlets 36. Accordingly, in the present embodiment, the depressurization chamber 39 is provided so as to overlap with the outlets 36 in the upper and lower direction. That is, since the depressurization chamber 39 vertically corresponds to the outputs 36, the air bubbles staying in the defoaming chambers 35 can be efficiently defoamed to the depressurization chamber 39.

(3) Since the partition 40 has a thickness smaller than that of the other portion of the partition wall 31 except the partition 40, the partition 40 has high gas permeability than that of the other portion except the partition 40 and the other portion except the partition 40 has high rigidity than that of the other portion except the partition 40. Accordingly, while the strength of the partition wall 31 between the defoaming chambers 35 and the depressurization chamber 39 is ensured in the other portion except the partition 40, the air bubbles staying in the defoaming chambers 35 can be efficiently defoamed from the partition 40 to the depressurization chamber 39. Since the thickness of the partition 40 is set such that the air bubbles included in the defoaming chambers 35 move to the depressurization chamber 39 via the partition 40 by the depressurization of the depressurization chamber 39 and the thickness of the other portion except the partition 40 in the partition wall 31 is set such that air (atmosphere) does not permeate into the defoaming chambers 35 although the depressurization chamber 39 is depressurized, the air bubbles included in the defoaming chambers 35 can be defoamed to the depressurization chamber 39 with certainty without newly introducing the air bubbles into the defoaming chambers 35.

(4) In the defoaming unit 20, the six defoaming chambers 35 are arranged in a horizontal direction and the sectioning walls 42 and 43 for sectioning the defoaming chambers 35 are configured so as to allow the permeation of the gas by the depressurization of the depressurization chamber 39. Accordingly, the air bubbles staying in the defoaming chambers 35 can permeate the sectioning walls 42 and 43 and freely move between the defoaming chambers 35. Accordingly, when the air bubbles included in the defoaming chambers 35 are defoamed to the depressurization chamber 39, the air bubbles of the defoaming chamber 35 in which defoaming is not completed move to the defoaming chamber 35 in which the defoaming is first completed, of the defoaming chambers 35, permeate the partition 40 corresponding to the defoaming chamber 35, in which the defoaming is first completed, and are defoamed to the depressurization chamber 39. As a result, the defoaming of the air bubbles are compensated for by the defoaming chambers 35, and the air bubbles staying in the defoaming chambers 35 are efficiently defoamed to the depressurization chamber 39. That is, the air bubbles of the defoaming chamber 35 in which the defoaming is not completed can be indirectly defoamed to the defoaming chamber 35 in which the defoaming is first completed, of the deforming chambers 35.

(5) The partition concave portions 41 have the right side surface 41*a* or the left side surface 41*b* (slope surface) configured by the slope surface for allowing the air bubbles suspended in the inks included in the defoaming chambers 35 to move toward the partition 40. Accordingly, since the air bubbles staying in the defoaming chamber 35 move to the partition 40 along the right side surface 41*a* or the left side surface 41*b*, the air bubbles included in the defoaming chambers 35 are susceptible to be collected in the partition wall concave portions 41.

(6) Since the partition wall 31 is formed of a plate material made of synthetic resin having rigidity, the strength of the partition wall 31 can be ensured. In addition, in the defoaming unit 20, the six defoaming chambers 35 are arranged in a horizontal direction and the six defoaming chambers 35 partially overlap with one depressurization chamber 39 in plan view. Accordingly, the air bubbles included in the inks of the six defoaming chambers 35 can be defoamed to one depressurization chamber 39. As a result, since the number of depressurization chambers 39 is smaller than that of the defoaming chambers 35, the miniaturization of the defoaming unit 20 can be realized and thus the miniaturization of the liquid supply apparatus can be realized. Accordingly, the miniaturization of the liquid supply apparatus can be realized while the strength of the partition wall 31 between the defoaming chambers 35 and the depressurization chamber 39 is ensured.

Since, in the defoaming unit 20, the six defoaming chambers 35 partially overlap with one depressurization chamber 39 in plan view (in the upper and lower direction) the area of the depressurization chamber 39 in plan view can be reduced compared with the case where all the six defoaming chambers 35 wholly overlap with one depressurization chamber 39 in plan view.

(7) Since, in the defoaming unit 20, the partition 40 has gas permeability higher than that of the defoaming chamber forming member 30 forming the defoaming chambers 35 and the depressurization chamber forming member 32 forming the depressurization chamber 39, the air bubbles suspended in the inks contained in the defoaming chambers 35 can be defoamed to the depressurization chamber 39 with certainty while the airtightness of the defoaming chambers 35 and the depressurization chamber 39 is ensured.

(8) The flow rate of the inks passing through the defoaming chambers 35 is decreased as the size of the openings of the outlets is decreased, that is, is proportional to the size of the openings of the outlets 36. In contrast, the amount of gas defoamed from the defoaming chambers 35 is increased as the area of the wall surfaces is increased, that is, is proportional to the area of the wall surfaces 40*a*. By this configuration, the area of the wall surfaces 40*a* is larger than that of the openings of the outlets 36 and thus the air bubbles can be efficiently defoamed from the liquid passing through the defoaming chambers 35.

Modified Example

The above-described embodiment may be changed as follows.

The sectioning walls 42 do not need to be configured so as to allow the permeation of the gas.

The wall surfaces 40*a* of the partition 40 at the side of the defoaming chambers 35 may not have liquid repellency for repelling the ink.

The depressurization chamber 39 does not need to be provided so as to overlap with the outlets 36 in the upper and lower direction.

The depressurization chamber 39 may wholly overlap with the defoaming chambers 35 in the upper and lower direction.

The depressurization chamber 39 may be separately provided with respect to the six defoaming chambers 35.

Two depressurization chambers 39 may be provided with respect to the six defoaming chambers 35 such that the three defoaming chambers 35 correspond to one depressurization chamber 39. Alternatively, three depressurization chambers 39 may be provided with respect to the six defoaming chambers 35 such that the two defoaming chambers 35 correspond to one depressurization chamber 39.

A film having liquid repellency for repelling the ink is adhered to the wall surfaces 40*a* of the partition 40 at the side of the defoaming chambers 35 such that the wall surfaces 40*a* have liquid repellency. Alternatively, the partition 40 may be formed of a liquid repelling material.

The material of the partition wall 31 may be equal to that of the depressurization chamber forming member 32 and the defoaming chamber forming member 30.

The materials of the depressurization chamber forming member 32, the partition wall 31 and the defoaming chamber forming member 30 may be different from one another. In this case, it is preferable that the material of the partition wall 31 has gas permeability higher than that of the material of the defoaming chamber forming member 30 and the depressurization chamber forming member 32.

Figure 5:
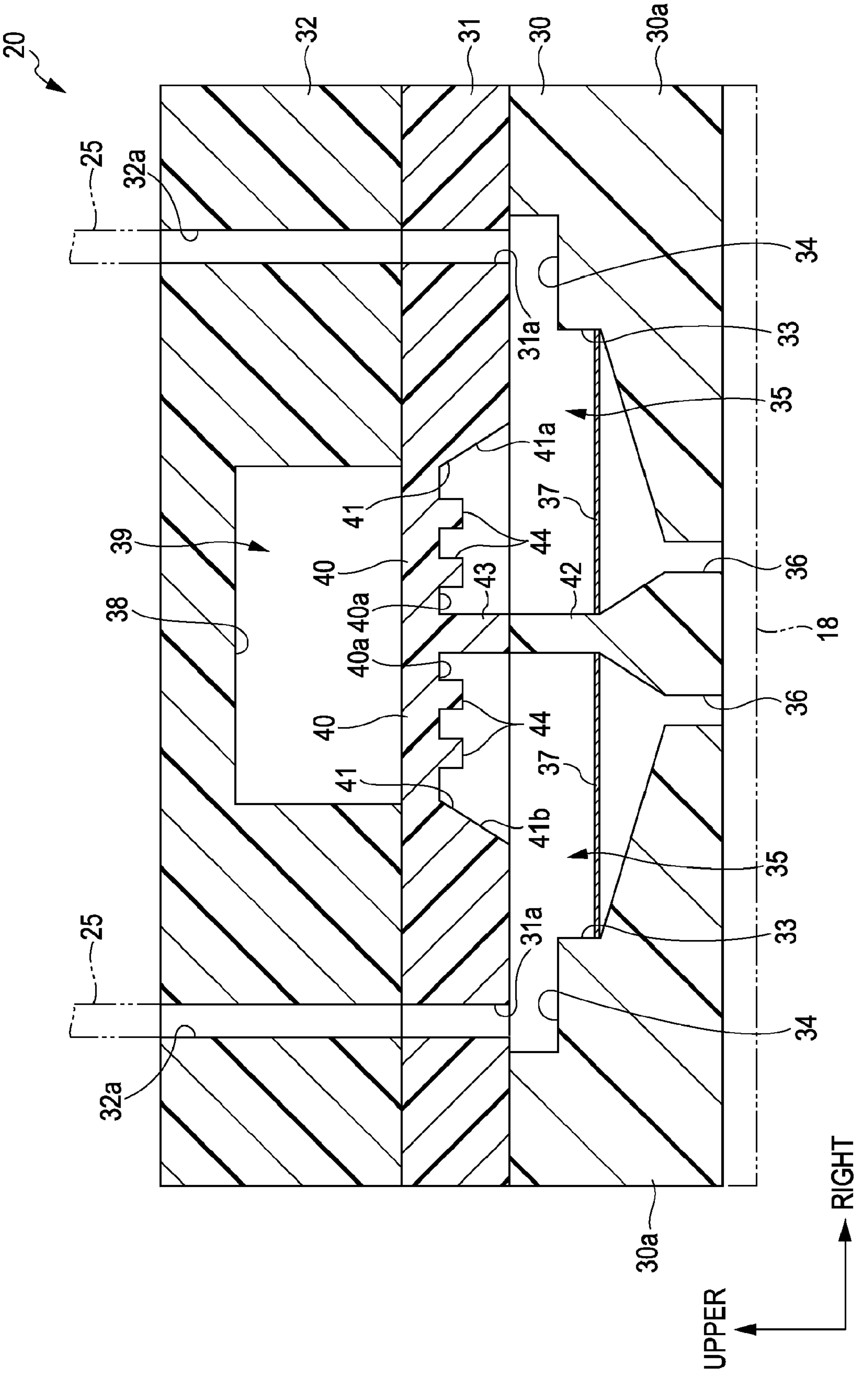
FIG. 5 is a cross-sectional view of a deforming unit of a printer of a modified example of the invention.

As shown in FIG. 5, a plurality (two in the present embodiment) of ribs 44 protruding toward the inside of the defoaming chambers 35 may be provided in the partition 40. In particular, the ribs 44 are provided so as to extend in a direction perpendicular to an ink introduction direction, that is, a direction in which the inks pass through the inside of the defoaming chambers 35 such that the air bubbles suspended by the flow of the inks is suitably caught so as to readily collect the air bubbles in the vicinity of the wall surfaces 40*a*. The ribs 44 may be provided to extend in the left and right direction (ink introduction direction). By forming the ribs 44 in the partition 40, the strength of the partition 40 can be improved.

The defoaming chambers 35 do not need to be provided below the depressurization chamber 39 in a vertical direction and the defoaming chambers 35 may be provided above the depressurization chamber 39 with the partition interposed therebetween. Alternatively, the defoaming chambers 35 are horizontally arranged with the partition interposed therebetween. Since the partition is inserted into the defoaming chambers 35 so as to apply negative pressure to the depressurization chamber 39, it is possible to suppress the growth of the air bubbles in the defoaming chambers 35.

In the defoaming chambers 35, a portion of the depressurization chamber 39 is provided with the partition 40 interposed therebetween at an upper position of a gravity direction of the partition wall concave portions 41 (air bubble integrating portion and the concave portion) in which the air bubbles suspended in the inks are collected. That is, for example, the partition having the partition wall concave portion formed toward the upper side of the gravity direction may be used as the defoaming chambers and the depressurization chamber which are adjacent in the horizontal direction. In this case, the partition is formed in a slope shape such that the lower portions of the defoaming chambers are introduced into the depressurization chamber. Accordingly, the air bubbles are susceptible to be collected in the partition wall concave portions.

Although the depressurizing pump for depressurizing the inside of the depressurization chamber 39 had been described in this embodiment, the invention is not limited to it. For example, the inside of the defoaming chamber may be pressurized by a pressurizing pump for pressurizing the inside of the depressurization chamber is lower than that of the defoaming chamber. Another example configuration is as follows: the inside of the depressurization chamber 39 may be depressurized by the depressurizing means (the depressurization pump), and at the same time, the inside of the defoaming chamber may be pressurized so that pressure of the inside of the depressurization chamber is lower than that of defoaming chamber. Like these examples, any configuration can be possible if blockage of the downstream channel of the defoaming chamber pressurizes the ink in the upstream channel of the defoaming chamber.

Although, in the present embodiment, the ink jet printer 11 is embodied as the liquid ejecting apparatus, a liquid ejecting apparatus for ejecting a liquid other than the inks (including a liquid obtained by dispersing or mixing particles of a functional material to a liquid or a fluid such as gel) may be embodied. In the present specification, the "liquid" includes a liquid and a fluid in addition to an inorganic solvent, an organic solvent, a solution, liquid resin and liquid metal (metallic melt).

Although, in the above-described embodiment, the ink jet printer 11 is embodied as the liquid ejecting apparatus, a liquid ejecting apparatus for ejecting or discharging a liquid other than the ink may be employed. The invention is applicable to various types of liquid ejecting apparatuses including a liquid ejecting head for discharging a small amount of liquid droplets. The liquid droplets indicate a liquid state discharged from the liquid ejecting apparatus and include a granular shape, a tear shape, and a thread shape. The term "liquid" described herein may be a material which can be ejected from the liquid ejecting apparatus. For example, the liquid includes a state when the material is a liquid phase; a flow state such as a liquid having high or low viscosity, sol, gel water, an organic solvent, an inorganic solvent, a solution, liquid resin and liquid metal (metallic solution); a liquid as one state of the material; and a material obtained by dissolving, dispersing or mixing the particles of the functional material made of a solid such as pigment or metal particles. As a representative example of the liquid, the ink described in the above-described embodiment or liquid crystal may be used. The ink includes various types of liquid compositions such as an aqueous ink, oil-based ink, a gel ink and a hot-melt ink. The examples of the liquid ejecting apparatus include, for example, a liquid ejecting apparatus for ejecting a liquid including a material, such as an electrode material or a coloring material, used for manufacturing a liquid crystal display, an electroluminescence (EL) display, a field emission display and a color filter in a dispersion or dissolution form; a liquid ejecting apparatus for ejecting a bio organic matter used for manufacturing biochips; a liquid ejecting apparatus for ejecting a liquid which is a sample such as a precision pipette, a printing apparatus and a micro dispenser. In addition, a liquid ejecting apparatus for ejecting lubricating oil to a precision machinery such as clocks or cameras by a pinpoint, a liquid ejecting apparatus for ejecting a transparent resin solution such as ultraviolet curing resin onto a substrate in order to form a minute semispherical lens (optical lens) used for an optical communication element, and a liquid ejecting apparatus for ejecting an etchant such as acid or alkali in order to etch substrates or the like may be employed. The invention is applicable to any one of the above-described liquid ejecting apparatuses.

What is claimed is:

1. A liquid supply apparatus comprising:

a defoaming chamber forming member;

a partition wall located on an upper surface of the defoaming chamber forming member;

a depressurization chamber forming member located on an upper surface of the partition wall, wherein the material of the partition wall is different from the material of the defoaming chamber forming member or the depressurization forming member;

a liquid supply path which supplies a liquid from an upstream side, which is a liquid supply source, to a downstream side in which the liquid is consumed;

a defoaming chamber defined by the defoaming chamber forming member which is provided in the liquid supply path and defoams air bubbles included in the liquid; and a depressurization chamber defined by the depressurization chamber forming member which is provided at a position adjacent to the defoaming chamber with a partition interposed therebetween and has a lower pressure than the pressure of the defoaming chamber, wherein the partition allows permeation of gas and restricts permeation of the liquid, and wherein the partition is configured by the partition wall having rigidity.

2. The liquid supply apparatus according to claim 1, wherein a portion of the partition wall configuring the partition has a thickness smaller than that of the other portions of the partition wall that are not part of the portion of the partition wall configuring the partition.

3. The liquid supply apparatus according to claim 1, wherein the depressurization chamber and the defoaming chamber are disposed such that, in portions which are adjacent to each other with the partition interposed therebetween, the portion of the depressurization chamber is higher than the portion of the defoaming chamber in a vertical direction.

4. A liquid supply apparatus comprising:

a liquid supply path which supplies a liquid from an upstream side, which is a liquid supply source, to a downstream side in which the liquid is consumed;

a plurality of defoaming chambers which are provided in the liquid supply path and defoam air bubbles included in the liquid; and a depressurization chamber which is provided at a position adjacent to the plurality of defoaming chambers with a partition wall interposed therebetween and has a lower pressure than the pressure of the plurality of defoaming chambers, wherein the partition wall allows permeation of gas and restricts permeation of the liquid, wherein the depressurization chamber and the plurality of defoaming chambers partially overlap with each other in an upper and lower direction, and wherein the partition interposed between the plurality of defoaming chambers and the depressurization chamber has a thickness smaller than that of other portions of the partition wall that are not part of the partition.

5. The liquid supply apparatus according to claim 1, wherein the partition is disposed so as to overlap with the depressurization chamber and an outlet for discharging the liquid from the defoaming chamber to the downstream side in an upper and lower direction.

6. The liquid supply apparatus according to claim 5, wherein the area of the partition which is in contact with the defoaming chamber is larger than the area of the opening of the outlet formed in the defoaming chamber.

7. The liquid supply apparatus according to claim 1, wherein the partition wall is configured by a plate material having rigidity.

8. The liquid supply apparatus according to claim 1, wherein the defoaming chamber is arranged in plurality and at least a portion of sectioning walls for sectioning the defoaming chambers is configured so as to allow the permeation of the gas by the depressurization of the depressurization chamber.

9. A liquid ejecting apparatus comprising a liquid ejecting head which ejects a liquid, and the liquid supply apparatus which supplies the liquid to the liquid ejecting head according to claim 1.

* * * * *